April 5, 1966  G. A. SPROWL ETAL  3,244,216
TIRE
Filed Dec. 16, 1963

INVENTOR.
GEORGE A. SPROWL
BY JAMES R. TUCKER

J.B. Holden
ATTORNEY 3,244,216
TIRE
George A. Sprowl, Cuyahoga Falls, and James R. Tucker, Mogadore, Ohio, assignors to The Goodyear Tire & Rubber Company, Akron, Ohio, a corporation of Ohio
Filed Dec. 16, 1963, Ser. No. 330,792
3 Claims. (Cl. 152—356)

This invention relates to tubeless pneumatic tires, and more particularly to such tires in which large cords are used in the tire carcass.

The cross-sectional area of a cord increases with the square of its diameter, so the number and size of channels through a large cord which permit the passage of air are much greater than through a smaller cord. When used as the inner ply of a tubeless tire, although the inner surface of the tire is covered with an air-retaining elastomeric liner, a condition occurs at a lapped splice (whether the builder's splice or a stock-preparation splice) in which the cords of the under-lap, or those cords nearest the liner in the spliced area, project into the liner so that this lap in effect reduces the gauge of the air-retaining liner in the splice areas. The result is that a greater amount of air will penetrate the liner and enter the cords and be wicked through the cords into the interior of the tire carcass where it leads to degradation of the rubber and may produce air blisters within the tire. Any excessive wicking action may produce an objectionable loss of air within the tire.

Also, more air penetrates radially through tire plies of large cords than through plies of smaller cords.

These large cords may be composed of cotton, nylon, rayon, polyester or other organic material. Their air impermeability depends upon their composition, structure, and the pressure of the air within the tires which may in many cases be in the region of 400 p.s.i.g. Therefore, no cord size can be established as critical for the purpose of this invention, and the term "large cords" will be used herein to refer to cords of sizes that cause difficulty, i..e. cords generally about .03 inch gauge or larger.

According to this invention one or more barrier plies of smaller cords are located between the inner ply of large cords and the air-retaining liner, which prevent the under-lap cords or those cords nearest the liner, in the spliced areas, from projecting into and thus thinning down this liner. Such thinning down of the liner over the cords in the splice area reduces its effectiveness. In a tire in which there is a ply of smaller cords between the ply of large cords and the liner, the air loss through the tire is no greater than that through a tire in which all of the plies are made of smaller cords.

The invention is further described in connection with the accompanying drawings, in which—

Figure 1:
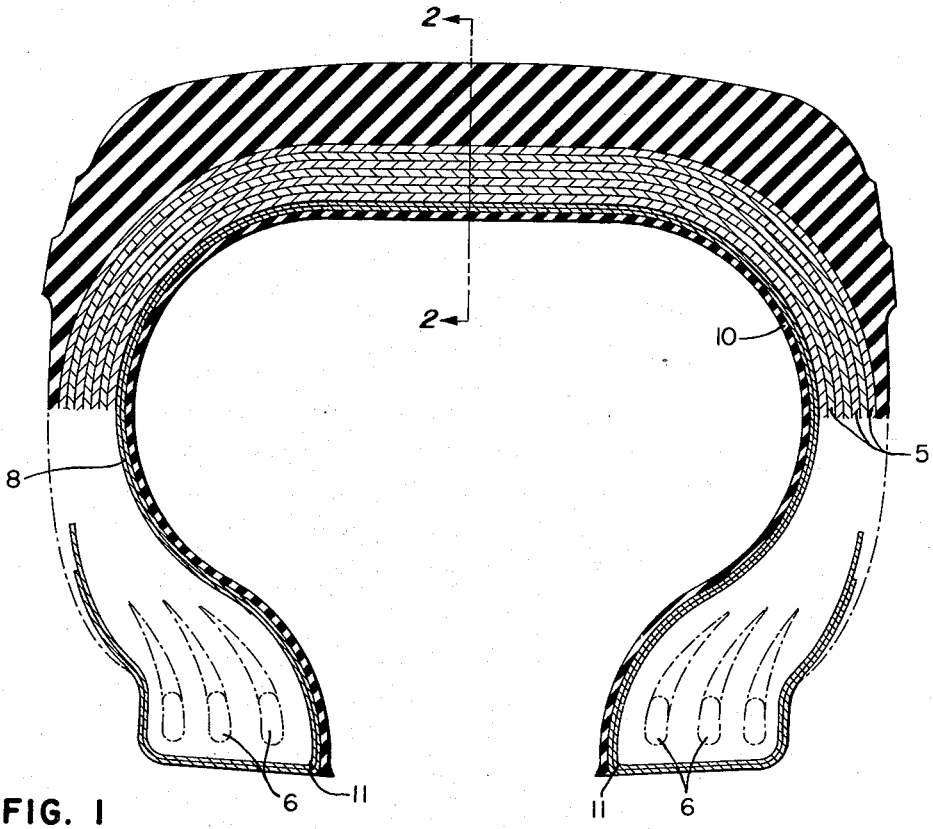
FIGURE 1 is a section through a tire of this invention.

FIGURE 1 illustrates a tubeless airplane tire more particularly, in which there are many carcass fabric plies 5 and multiple beads 6. These plies are bias cut, and the cords in adjacent plies generally cross one another. The invention is applicable to tubeless tires of other constructions using large cords. They may have a single bead and as few as two such large-cord plies.

There are one or more plies 8 of smaller cords; two such plies are shown. These cover the ply edges or the under-lap cords at the splice and extend over the interior of the tire, at least to the toes 11 of the tire, and may extend under and around the beads, as shown. Thus they cover the whole of the interior surface of the tire. The liner 10 is of any tubeless tire composition and thickness, and generally ends at the bead toes 11.

The inner plies 8 which are composed of smaller cords may, for example, be of nylon cord having constructions and approximate gauges as follows:

| Construction: | Gauge, inch |
|---|---|
| 840/2 | .021 |
| 840/3 | .026 |
| 1260/2 | .026 |
| 1260/3 | .031 |

A ply 8 of 1260/3 nylon with a gauge of substantially .031 inch, would be satisfactory only with carcass plies of substantially larger cords. These smaller cords may be composed of cotton, rayon, polyester or other organic composition, and of any suitable construction.

Figure 2:
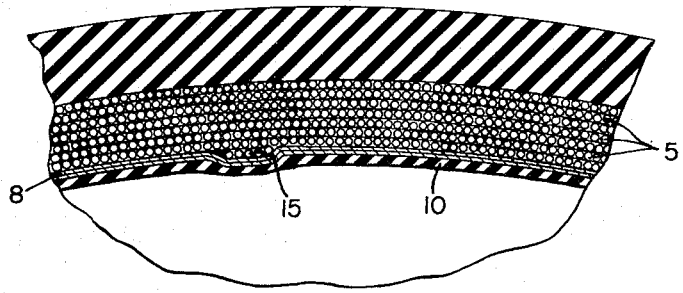
FIGURE 2 is an enlarged section on the line 2—2 of FIGURE 1.

FIGURE 2 illustrates a splice 15 in the innermost ply 5 of large cords. The plies 8 of smaller cords are inside of this; and the air-retaining liner 10 on the inner surface of the tire covers these plies 8.

The cords 15 may be .03- or .04-inch gauge or larger, and the rate of penetration of air through these plies when a tire is inflated under the pressure for which it is designed, particularly the inner ply, as explained, is high. The inner plies of smaller cords may be as large as substantially .03-inch gauge, although these cords will ordinarily be of smaller gauge.

The invention is covered in the claims which follow.

What we claim is:

1. A tubeless pneumatic tire which comprises a carcass of at least two fabric plies composed of cords of at least substantially .03-inch gauge, there being a splice in the innermost of said plies, an air-retaining elastomeric liner which is a distinct element which covers the inside of the tire, and between said fabric plies and the liner at least one ply of smaller cords which covers the inner surface of said larger-cord plies at least to substantially the toes of the tire.

2. A tubeless pneumatic tire which comprises a carcass of fabric composed of large cords with a lapped splice in the inner ply thereof so that the cords in the under-lap at the splice project toward the interior of the tire, an air-retaining elastomeric liner which is a distinct element on the inner surface of the tire, and a fabric composed of smaller cords between said ply of large cords and the liner, said smaller-cord fabric extending at least over said inwardly projecting cords at the splice of the tire.

3. A tubeless pneumatic tire with plies of large cords in the carcass and a lapped splice in the inner of said plies, an elastomeric air-retaining liner which is a distinct element on the inner surface of the tire, and between said liner and said inner carcass ply of large cords a ply of smaller cords which protects the liner from penetration by the inwardly projecting cord ends in the under-lap of the splice.

References Cited by the Examiner
UNITED STATES PATENTS

| 2,317,911 | 4/1943 | Hoff | 152—357 X |
| 2,317,912 | 4/1943 | Howe | 152—356 |
| 2,990,870 | 7/1961 | Vittorelli | 152—356 |
| 2,991,818 | 7/1961 | Gay et al. | 152—359 X |

ARTHUR L. LA POINT, Primary Examiner.